United States Patent [19]

Townend

[11] Patent Number: 5,475,593
[45] Date of Patent: Dec. 12, 1995

[54] DISTRIBUTED ACTIVE VEHICLE SUSPENSION SYSTEM

[75] Inventor: Richard Townend, Norwich, Great Britain

[73] Assignee: TRW Inc., Lyndhurst, Ohio

[21] Appl. No.: 347,843

[22] Filed: Dec. 1, 1994

Related U.S. Application Data

[63] Continuation of Ser. No. 872,588, Apr. 23, 1992, abandoned.

[30] Foreign Application Priority Data

Apr. 23, 1991 [GB] United Kingdom .................. 9108729

[51] Int. Cl.$^6$ ............................................. B60G 17/015
[52] U.S. Cl. .................. 364/424.05; 280/707; 280/840; 280/DIG. 1
[58] Field of Search ...................... 364/424.05; 280/707, 280/709, 711, 714, 840, DIG. 1

[56] References Cited

U.S. PATENT DOCUMENTS

| | | | |
|---|---|---|---|
| 4,787,649 | 11/1988 | Watanabe et al. | 280/707 |
| 4,897,776 | 1/1990 | Urababa et al. | 364/424.05 |
| 4,934,731 | 6/1990 | Hiwatashi et al. | 280/698 |
| 5,024,460 | 6/1991 | Hanson et al. | 280/707 |
| 5,033,770 | 7/1991 | Kamimura et al. | 280/707 |
| 5,034,890 | 7/1991 | Sugasawa et al. | 364/424.05 |
| 5,062,658 | 11/1991 | Mayeed | 280/707 |
| 5,071,159 | 12/1991 | Kamimura et al. | 280/707 |
| 5,103,396 | 4/1992 | Hiwatashi et al. | 364/424.05 |
| 5,119,297 | 6/1992 | Buma et al. | 364/424.05 |
| 5,144,559 | 9/1992 | Kamimura et al. | 364/424.05 |
| 5,165,715 | 11/1992 | Sakamoto et al. | 280/707 |
| 5,218,545 | 6/1993 | Takehara | 364/424.05 |
| 5,232,242 | 8/1993 | Bachrach et al. | 280/707 |
| 5,235,529 | 8/1993 | Hanson et al. | 364/572 |

*Primary Examiner*—Kevin J. Teska
*Assistant Examiner*—Collin W. Park
*Attorney, Agent, or Firm*—Tarolli, Sundheim & Covell

[57] ABSTRACT

A vehicle suspension system has hydraulically extensible and contractable actuators 14 connected between the vehicle body and the wheel assemblies 17. The actuators 14 are controlled by valves 25 to control the vehicle attitude. The valve 25 of each of the actuators 14 is controlled by a first device such as a digital processor 100, 200, 300 and 400 respectively which is individual to the respective actuator and a second device such as a digital processor 500 which controls all of the actuators 14. Signals generated from the first and second devices are combined to form control signals for each actuator 14. Signals from the second device 500 are filtered before being combined with those from the first device 100, 200, 300 or 400 to remove signals from the second device 500 that are outside a particular band width. The filtering means may be adjustable to set the band width of frequencies above which signals from the second device are removed. Preferably the second device 500 is responsive to signals for resolving heave, pitch, roll and warp of the vehicle.

16 Claims, 3 Drawing Sheets

DISTRIBUTED ACTIVE VEHICLE SUSPENSION SYSTEM

This is a continuation of copending application(s) Ser. No. 07/872,588 filed on Apr. 23, 1992, now abandoned.

This invention relates to a vehicle suspension system and particularly to a vehicle suspension system which comprises a plurality of actuators.

In EP 0114757 there is disclosed a wheeled land vehicle having an active suspension vehicle including suspension devices in the form of hydraulic actuators, by which the wheels (unsprung masses) of the vehicle are mounted to the body (sprung mass) of the vehicle. The suspension devices are controlled by signals generated by a control device which resolves the forces acting on the vehicle into four modes; heave, pitch, roll and warp. The control device calculates required extensions of hydraulic actuators by modelling a modal spring and damper suspension system.

In WO 90/15726 there is described a vehicle suspension system which comprises a plurality of hydraulic actuators, each of which connects one unsprung mass to the sprung mass. Each hydraulic actuator has an individual control device associated with it. A further control device is provided in the system to control all of the actuators. The individual control devices for the actuators control the actuators in response to road inputs, that is to say high frequency loads imposed on the unsprung masses by perturbations in the road surface underneath the relevant travelling vehicle. The secondary central control device controls the hydraulic actuators in response to driver inputs, that is to say the forces applied on the vehicle due to cornering, acceleration, braking, etc. Signals from the central control device are combined with signals from a corner control device to control a particular actuator.

The invention provides a vehicle suspension system comprising a plurality of actuators connected between the vehicle body and the wheel and hub assemblies of the vehicle and controlled by control devices to contract and extend to control the attitude of the vehicle, wherein at least one actuator is controlled both by a first control device individual to the actuator and by a second control device which controls a plurality of actuators, control signals generated by both the first and second control devices being combined to form control signals for the actuator, characterised in that signals from the second control device are filtered by filtering means before they are combined with signals from the first control device, the filtering means acting to remove signals from the second control device that are outside a predetermined bandwidth.

By passing the signals from the second control device controlling the plurality of actuators through a filtering means the hydraulic actuators can be controlled smoothly, since the control signals received by the actuators from the second control device can be limited to signals of low frequency.

The invention also provides a vehicle suspension system comprising a plurality of actuators connected between the vehicle body and the wheel and hub assemblies of the vehicle and controlled by control devices to contract and extend to control the attitude of the vehicle, wherein at least one actuator is controlled both by a first control device individual to the actuator and a second control device which controls a plurality of actuators, control signals generated by both the first and second control devices being combined to form control signals for the actuator, characterised in that signals from the second control device are combined with signals from the first control device after modification by an amplitude modification means, which amplitude modification means acts to decrease the difference in amplitude between successive control signals generated by the second control device by modifying the amplitude of the latter control signal.

If the second control device requires a large change in extension of the actuator, then by using the method of the invention the suspension system prevents a sudden large extension of the actuator by gradually introducing the required change by modification of the control signals received from the second control device.

The invention further provides a vehicle suspension system comprising a plurality of actuators connected between a vehicle body and wheel and hub assemblies of the vehicle and a plurality of electrical or electronic control devices for controlling the actuators to contract and extend to control the attitude of the vehicle body, wherein at least one actuator is controlled by control signals which are the combination of control signals produced by a first control device individual to the actuator and a second control device which controls a plurality of actuators, the first control device generating control signals of a first frequency and the second control device generating control signals of a second frequency lower than the first frequency, filtering means being provided to filter the control signals generated by the second control device to remove signals outside a predetermined bandwidth before combination of the signals with signals generated by the first control device.

It is an advantage of the present system that large requirements of movements from the central control device which add suddenly to large extension requirements of the corner control devices are smoothly combined to give smooth extension of the relevant actuator. This is particularly advantageous when the central control device is a digital processor which operates at a clock frequency lower than the corner control devices which are also digital processors.

Preferably the filtering means of the invention are adjustable to set the bandwidth of frequencies above which signals from the second control device are removed.

Preferably the first and second control devices are digital processors and the first control device operates at a higher clock frequency than the second control device.

Preferably the second control device receives signals from force sensors which measure the force transmitted by each actuator to the vehicle body and resolves the forces into the modal forces of heave, pitch, roll and warp.

In a first preferred embodiment the first control device generates control signals using signals generated by sensors measuring displacement of and forces on the vehicle body in a first model of a spring and damper system and the second control device generates control signals using the signals generated by the sensors in a second model of a spring and damper system. The second control device preferably uses a model of a spring and damper system acting in the modal co-ordinates of heave, pitch, warp and roll.

Preferably the second control device generates control signals which control an actuator to extend to compensate for deflection of the tires under loading.

The second control device preferably controls an actuator to respond to low frequency loading on the vehicle body arising from maneuvering of the vehicle.

A preferred vehicle suspension system according to the invention will now be described with reference to the accompanying drawings in which.

Figure 1:
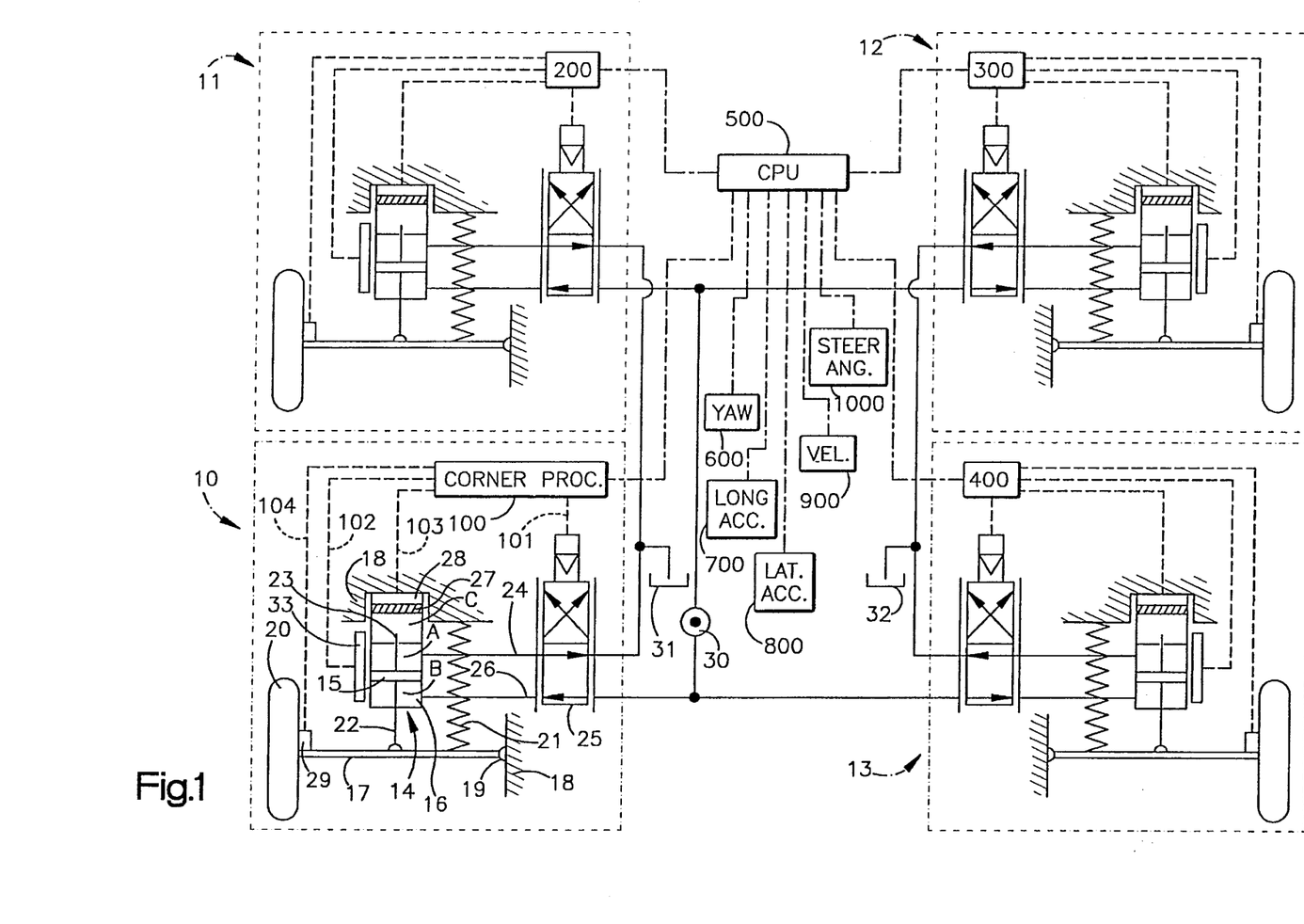
FIG. 1 is a schematic representation of a vehicle suspension system according to the invention.

Referring to FIG. 1 the active suspension system can be seen to comprise four corner units 10, 11, 12 and 13. Each corner unit is essentially identical to the other three corner units. Describing the first corner unit 10, it comprises a hydraulic actuator 14 having a piston 15 within a cylinder 16. The piston 15 is movable relative to the cylinder 16. The piston 15 is connected to a suspension arm 17 which is pivotally mounted to the vehicle body 18 by pivot mount 19. The suspension arm is also connected to a wheel and hub assembly 20. Acting in parallel with the hydraulic actuator 14 is a road spring 21. Both the road spring 21 and the hydraulic actuator 14 are connected between the vehicle body 18 and the suspension arm 17.

The piston 15 defines two chambers A and B within the hydraulic actuator 14. A rod 22 extends downwardly of the piston 14 to connect the piston 15 to the suspension arm 17. A rod 23 of diameter equal to the diameter of the rod 22 extends upwardly of the piston 15 through an upper surface defined in the cylinder and into a vacant chamber C. Since both sides of the piston 15 are connected to rods of equivalent diameter, both sides have equal areas.

Chamber A is connected by a line 24 to a servo-valve 25 and chamber B is connected via line 26 to the servo-valve 25. The servo-valve 25 is controlled by electrical control signals received through a line 101. The control signals are generated in part by a "corner" control device 100.

An LVIT (Linear Variable Induction Transducer) 33 is provided to generate signals indicative of the position of the piston 16. The LVIT generates electrical signals which it transmits by line 102 to the corner control device 100. A force transducer 28 generates signals indicative of the force transmitted from the hydraulic actuator 14 to the vehicle body 18. The signals are sent via line 103 to the corner control device 100. An accelerometer 29 is positioned on the hub to measure the acceleration of the hub as it pivots about the point 19. The accelerometer provides a signal indicative of the acceleration of the hub to the corner control device 100 via the line 104.

Each force transducer 28 is mounted directly to the vehicle body 18 and isolators such as 27, are interposed between the force transducers and the actuators. The isolators are necessary since the processors used as control devices are not always quick enough to move the actuators to prevent all shocks from being transmitted to the vehicle body and therefore the isolators provide some passive response to force inputs.

Each servo-valve 25 of the corner assemblies 10, 11, 12 and 13 is connected both to a source of pressurised fluid 30 and to one of two exhausts for pressurised fluid 31 and 32.

The servo-valve 25 of the corner unit 10 can be controlled to meter fluid into one of the chambers A or B from the source of pressurised fluid 30, whilst metering fluid out of the other chamber to one of the exhaust for pressurised fluid 31. By connecting one chamber to the source of pressurised fluid, whilst connecting the other chamber to an exhaust for pressurised fluid a pressure difference is established across the piston 15 and therefore a resultant force is applied on the piston 15. The velocity of the piston 15 is controlled by metering the flow of fluid into and out of the chambers A and B.

Each of the corner units 10 and 11, 12 and 13 has essentially the same components and like components will be referenced accordingly. However, it is important to note that each of the corner units has its own individual control device, the four control devices 100, 200, 300 and 400, which are all connected to a central control device 500. The control device 500 is also connected to five sensors 600, 700, 800, 900 and 1000.

The sensor 600 measures the yaw rate of the vehicle, that is to say the rate at which the vehicle rotates about a chosen point on the chassis.

The sensor 700 measures the longitudinal acceleration of the vehicle body, that is to say the acceleration of the body in the direction of motion of the vehicle.

The sensor 800 measures the lateral acceleration of the vehicle body, that is to say the acceleration of the vehicle body in the direction perpendicular to the direction of motion of the vehicle body.

The sensor 900 measures the velocity of the vehicle body.

The sensor 1000 is provided to measure the steering angle of the vehicle wheels, that is to say the angle at which the front wheels of the vehicle make to a chosen reference plane.

The control system shown is a distributed active suspension system. Each of the five control devices 100, 200, 300, 400, 500 in the preferred embodiment is a digital processor and the processors communicate with each other using digital signals. Having four corner control devices and one central control device is inherently safer, requires cheaper and smaller individual processors and reduces the distance that analogue signals from the sensors need to travel.

Figure 2:
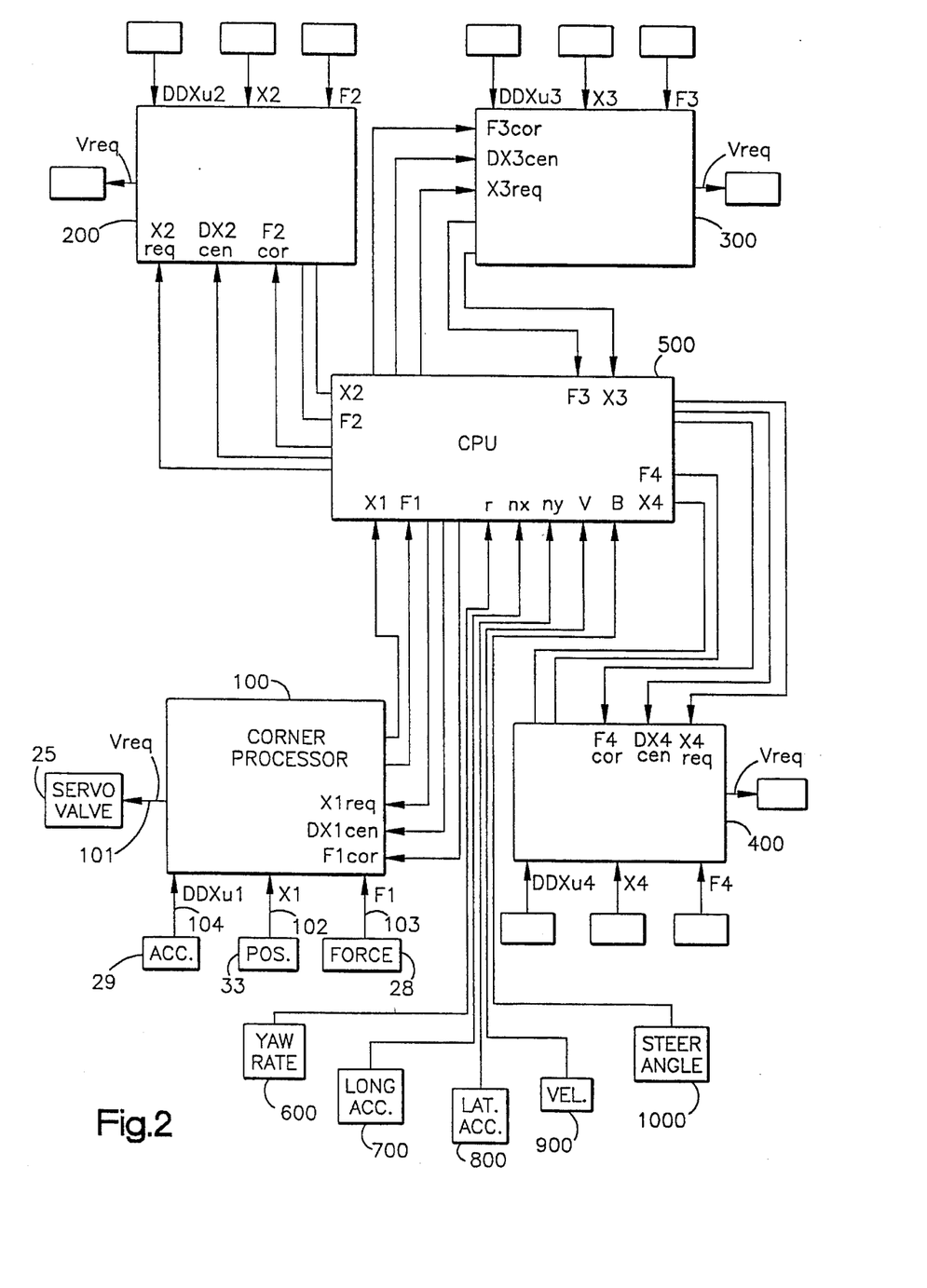
FIG. 2 is a schematic diagram showing the inputs to and outputs from the control devices of the suspension system of the invention.

Each of the corner processors, 100, 200, 300 and 400 sends to the central processor 500 signals indicative of actuator displacement (X1,X2,X3,X4) and force measured by the load cell (F1,F2,F3,F4), as can be seen in FIG. 2. The central processor 500 returns to each of the corner processors three demand signals;

1. F1COR to F4COR—each of the corner processors receives a force correction term based on dynamic inputs to the central processor.
2. DX1CEN to DX4CEN—corner velocity demands from the central processor based on a model of modal stiffness and dampings.
3. X1REQ to X4REQ—required displacement based on modal tire/isolator stiffnesses to modal displacements under dynamic loads.

The central processor resolves the signals it receives into modal calculations. The central processor 500 considers the forces acting on the vehicle and the resulting displacements of the vehicle as comprising four different types, heave, pitch, roll and warp. Displacements arising from modal forces are shown in FIGS. 3a, 3b, 3c and 3d.

Figure 3A:
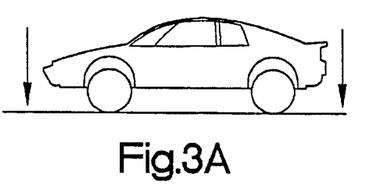
FIGS. 3a, 3b, 3c and 3d show the displacement modes of the vehicle body as considered by the central control device of the active suspension system of the invention.

FIG. 3a shows heave displacement, which is displacement directly upwardly and downwardly of the vehicle body. The processor considers a downward heave displacement to be a positive heave.

Figure 3B:
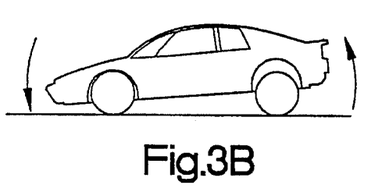

FIG. 3b shows a pitch displacement of the vehicle body, that is to say a rotation about an axis perpendicular to the longitudinal principal axis of the main body. The processor considers a pitching with nose down to be positive.

Figure 3C:
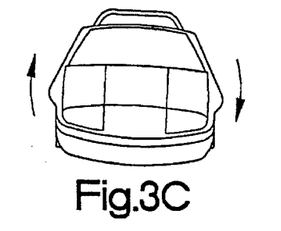

FIG. 3c shows the roll displacement of the vehicle considered by the actuator. The roll displacement is a displacement of a vehicle about the longitudinal axis of the vehicle. A roll with the lefthand side of the vehicle downwards is considered positive.

Figure 3D:
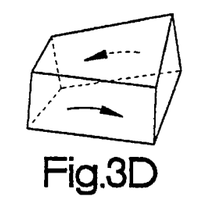

FIG. 3d shows the warp mode displacement of the vehicle considered by the actuator. The warp displacment arises when the forces acting on the vehicles four wheels tend to apply torque in opposing directions at either end of the vehicle. A warp with the lefthand front and righthand rear downwards is considered positive.

The active suspension system aims to maintain constant loads on the vehicle body and tires to improve the vehicle stability and reduce noise input.

The operation of the central control device and the corner control devices will now be discussed separately.

The Central Control Device

The central control device functions in modal co-ordinates. It converts the measured forces at the actuators into modal forces as follows:

1. Heave Force $$Hf = K_1*[IVrfH*(F1 + F1sp + F2 + F2sp) + IVrrH * (F3 + F3sp + F4 + F4sp)] + Hfsp$$

where Hf = Heave force
F1,F2,F3,F4 = forces measured by the load cells
F1sp,F2sp, = forces transmitted to the vehicle
F3sp,F4sp    body by the road springs acting in parallel with the actuators
IVrfH = a correction constant to scale forces measured by the load cells on the front wheels
IVrrH = a correction constant to scale the forces measured by the load cells at the rear wheels
$K_1$ = scaling constant chosen to enable factors to have fractional values and to achieve maximum resolution by a 32 bit accumulator used by the control devices
Hfsp = force correction term The IVrfH and IVrrH terms are necessary since each actuator acts on a pivot arm connected to a wheel and hub assembly and therefore the force transmitted to the wheel and hub assembly differs from that measured by the actuator and therefore must be scaled accordingly.

The F1sp, F2sp, F3sp and F4sp terms account for forces transmitted to the vehicle body by the road springs that act in parallel with the actuators. They are calculated as follows:

$F1sp = K_2*X1*Kcs1$ $F2sp = K_2*X2*Kcs2$ $F3sp = K_2*X3*Kcs3$ $F4sp = K_2*X4*Kcs4$ where X1,X2,X3,X4 = measured actuator displacements
Kcs1,Kcs2,Kcs3,Kcs4 = Road spring stiffnesses
$K_2$ = scaling constant to enable forces to have fractional values and to achieve maximum resolution by a 32 bit accumulator used by the control devices The Hfsp is a force correction term that is calculated for a particular suspension configuration to account for forces to the vehicle body through load paths that do not pass through the actuator and also to remove from the measured load any heave forces that arise from lateral forces acting on the tire which have a moment about the pivot point of the suspension arm and therefore are transmitted to the vehicle body. It is not essential to the invention and has been described in previous published patent specifications, such as PCT/GB 90/00628.

2. Pitch Force $$Pf = K_1*[IVrfP*(F1 + F1sp + F2 + F2sp) - IVrrP* (F3 + F3sp + F4 + F4sp)] + Pfsp$$

where Pf = Modal Pitch Force
F1,F2,F3,F4 = forces measured by the load cells
F1sp,F2sp, = forces transmitted to vehicle
F3sp,F4sp    body by the road springs (see above)
IVrfP = a constant to scale the forces acting in the front wheels to account for their moment about the centre of gravity of the vehicle
IVrrP = a constant to scale the forces acting on the rear wheels to account for their moment about the centre of gravity of the vehicle
$K_1$ = scaling constant (as hereinbefore described)
Pfsp = correction term for unmeasured forces 3. Roll Force $$Rf = K_1*[IVrfR*[(F1 + F1sp) - (F2 + F2sp)] + IVrrR* [(F3 + F3sp) - (F4 + F4sp)]] + Rfsp$$

where Rf = Modal Force Roll
F1,F2,F3,F4 = forces measured by the load cells
F1sp,F2sp, = forces transmitted to vehicle body
F3sp F4sp    by road springs (see above)
IVrfR = a constant to scale the forces acting on the front wheels to account for the moment of the forces about an axis longitudinal of the vehicle through its centre of gravity
IVrrR = a constant to scale the forces acting on the rear wheels to account for the moment of the forces about an axis longitudinal of the vehicle through its centre of gravity.
$K_1$ = scaling constant (as hereinbefore described)
Rfsp = correction force for unmeasured -continued $$Rf = K_1*[IVrfR*[(F1 + F1sp) - (F2 + F2sp)] + IVrrR* [(F3 + F3sp) - (F4 + F4sp)]] + Rfsp$$

forces

4. Warp Force $$Wf = K_1*[IVrfW*[(F1 + F1sp) - (F2 + F2sp)] - IvrrW*[(F3 + F3sp) - (F4 + F4sp)]] + Wfsp$$

where Wf = Modal Warp Force
F1,F2,F3,F4 = forces measured by the load cells
F1sp,F2sp,= forces transmitted to vehicle body
F3sp F4sp     by the road springs (see above)
IVrfW = a constant to scale the forces acting on the front wheels to convert them to a torque applied to the vehicle body
IvrfW = a constant to scale the forces acting on the rear wheeels to convert them to a torque applied to the vehicle body
$K_1$ = scaling constant (as hereinbefore described)
Wfsp = correction term for unmeasured loads The central control device also calculates the "dynamic" forces generated by the vehicle inertia in manoeuvres such as braking and cornering using the signals it receives indicative of vehicle yaw rate, longitudinal acceleration, lateral acceleration, velocity and steer angle, as follows;

5. Heave Dynamic Force $$HFdyn = K_3*[HCnx*Snx + Hcny*Msny + HCDr*MDr + HCv*V2]$$

where $K_3$=scaling constant to make best use of processor capacity

HFdyn=dynamic heave force

HCnx=deceleration/acceleration compensation gain in heave—calculated from test data HCny=lateral compensation gain in heave—calculated from test data HCDr=yaw acceleration compensation gain in heave—calculated from test data Snx=scaled lateral acceleration (scaled to accord with scaling of other parameters to utilise full capacity of processor)

Msny=absolute value of scaled lateral acceleration (scaled for the same reasons as Snx)

HCDr=absolute value of estimated yaw accleration

V2=velocity squared

6. Pitch Dynamic Force $$PFdyn = K_3*[PCnx*Snx + PCny*MSny + PCDr*MDr + PCv*V2]$$

where $K_3$=scaling constant (described above)

PFdyn=dynamic pitch force

PCnx=deceleration and acceleration compensation gain in pitch—calculated from test data Snx=scaled longitudinal acceleration PCny=clockwise/anti-clockwise lateral compensation gain in pitch—calculated from test data MSny=absolute scaled lateral acceleration PCDr=yaw acceleration compensation gain in pitch—calculated from test data MDr=absolute estimated yaw acceleration PCv=aero-dynamic pitch compensation term V2=velocity squared 7. Roll Dynamic Force $$RFdyn = K_3*[RCnx*Snx + RCnyc*Sny + RCDr*MDr]$$

where $K_3$=scaling constant (described above)

RFdyn=dynamic roll force

RCnx=deceleration and acceleration compensation gain in roll—calculated from test data RCnyc=conditioned roll compensation gain Snx=scaled longitudinal acceleration Shy=scaled lateral acceleration RCDr=yaw accleration compensation gain in roll—calculated from test data MDr=absolute yaw acceleration 8. Warp Dynamic Force $$Wfdyn = K_3*[Sny*Woff]$$

$$-Wmax < WFdyn < Wmax$$

where $K_3$=scaling constant (described above)

Wfdny=dynamic warp force

Sny=scaled lateral acceleration

Wolf=required warp (see below)

Wmax=dynamic warp force limit

The required warp term Woff is a term used to provide a cornering rate error adjustment. The term is calculated as a chosen function of the difference between the yaw rate demanded by the driver of the vehicle and the actual yaw rate achieved. The yaw rate demanded of the vehicle is proportional to the product of the steered angle of the front wheels of the vehicle and the velocity of the vehicle. The actual yaw rate of the vehicle is measured by the yaw gyrometer 600. The function chosen to generate the Woff from the difference between the demanded and the achieved yaw rate depends on the desired handling characteristics of the vehicle.

The central control device 500 uses the modal forces calculated from the corner sensors and the calculated dynamic modal forces together in a modelled system of "modal" springs and dampers, to calculate a required modal velocity demand. Considering the heave modal force, the system models a system as shown in FIG. 4 for each of the four modal forces.

Figure 4:
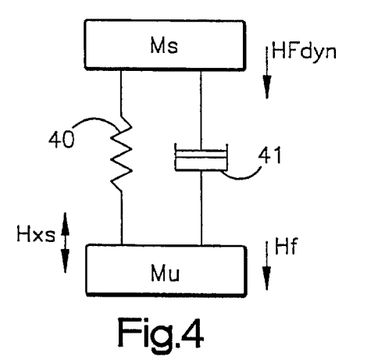
FIG. 4 shows schematically the model used by the central control device in calculating a velocity demand in modal Heave.

The model shown in FIG. 4 is the model used in Heave. The model has a mass Ms representative of the modal inertial mass of the vehicle body and a mass Mu representative of the modal masses of the wheel and hub assemblies. Acting between to the two masses Ms and Mu are a spring 40 with a spring rate MHKC and a damper 41 with a damping constant I/IHCC (IHCC being the Inherse Heave damping). The two constants MHKC and IHCC are chosen to give desired handling characteristics for the vehicle in Heave. Considering the mass spring damper equation for the system:

$$-Hf = [Hfdyn + MHKc*Hxs - \frac{Hdem}{IHCC}]$$

where Hf = Modal Heave Force calculated from load sensors (see before) - positive as shown in FIG. 4
Hfdyn = Modal Heave Force due to inertia of vehicle body (see before)
MHKc = desired modal stiffness in heave $\frac{I}{IHCC}$ = desired modal damping in heave Hdem = required modal velocity - negative for decreasing distances between Ms and Mu
Hxs = calculated modal displacement (described later)
Hence (Hdem [IHCC*([Hf + Hfdyn + MHKcHxs)]

In the preferred embodiment a scaling constant K2 is introduced to enable best use of the processor capacity. Therefore the preferred embodiment uses the following;

i $Hdem=K_3*HCC*(Hf+Hfdyn+MHKcWXS)$

Similar calculations are made for modal pitch, roll and warp velocities:

$Pdem=K_3.IPcc*[Pf+Pfdyn+MPKc*Pxs]$ $Rdem=K_3.IRcc*[Rf+RFdyn+MRKc*Rxs]$ $Wdem=K_3.IWcc*[Wf+Wfdyn+MWKc*Wxs]$ where
Pdem=demanded modal pitch velocity
Rdem=demanded modal roll velocity
Wdem=demanded modal warp velocity
IPcc=inverse of required damping in modal pitch
IRcc=inverse of required damping in modal roll
IWcc=inverse of required damping in modal warp
MPKc=required stiffness in modal pitch
MRKc=required stiffness in modal roll
MWKc=required stiffness in modal warp
$K_3$=scaling constant (hereinbefore described)

The modal velocity demand signals Hdem, Pdem, Rdem and Wdem are then converted into actuator co-ordinates to signals corresponding to velocities required of the individual actuators. A different velocity signal is sent to each control device 100, 200, 300 and 400, the signals respectively being DX1cen, DX2cen, DX3cen,and DX4cen.

Taking one quarter of the control system and considering the communication between the central control device 500 and the corner control device 100, the central control device generates a velocity signal DX1cen as follows:

DX1cen = $K_3$*[IVrfHO*Hdem + IVrfPO*Pdem + IVrfRO*Rdem + IVrfWO*Wdem]

where DX1cen = required velocity of actuator controlled by control device ioo
IVrfHO, IVrfPO,= scaling factors to convert modal
IVrfRo and    velocities to coordinates of
IVrfWO       actuator
$K_3$ = scaling factor to enable adequate DX1cen = $K_3$*[IVrfHO*Hdem + IVrfPO*Pdem + IVrfRO*Rdem + IVrfWO*Wdem]

use of processor capacity

The DX1cen signal is sent as a digital control signal of a discrete value and is a corner velocity demand based on modal stiffnesses and damping.

The central control device 500 also calculates and generates two further control signals to sent to corner control device 100, Fcor1 and Xreq1, which shall now be described.

Four signals X1req, X2req, X3req and X4req are generated by the central control device for each of the corner control devices 100, 200, 300 and 400. The signals are displacement demands for the actuators requesting displacements of the actuators to counteract displacements of the wheel and hub assemblies due to deflection of the tires and isolators (eg 28) under dynamic loading. The X1req signal is calculated as follows.

Figure 5:
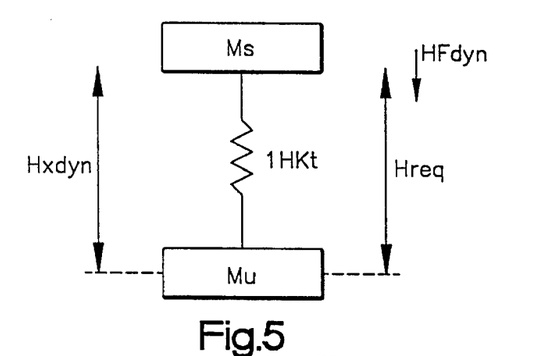
FIG. 5 shows schematically a model of suspension system used by the central processor to model tire and isolator stiffnesses.

Firstly a series of dynamic modal displacements are calculated by using a model of a modal spring to represent tire/isolator stiffness as can be seen in FIG. 5. The model is used to calculate what displacment of the wheel and hub assembly will result from dynamic forces applied to the tire and isolator. The modelled spring is used to represent the compliance of the tire and isolator. The mass/spring equation for the system may be written for dynamic modal heave as follows:

$-Hfdyn=IHKt^{-1}*(Hreq-Hxdyn)$ where
Hfdyn=dynamic modal heave (hereinbefore described)
IHKt=inverse of tire/isolator stiffness in modal heave
Hreq=required ride height
Hxdyn=dynamic modal displacement of unsprung masses from the sprung mass Hence $Hxdyn=Hreq+IHKt*HFdyn$ Scaling with a scaling constant $K_3$ to ensure best use of process or capacity the system uses the following $Hxdyn=K_3*IHKt*HFdyn+Hreq$ Similarly for pitch, roll and warp:
Pitch:

$Pxdyn=K_4*IPkt*PFdyn+Preq$ where
Preq=required pitch of vehicle
IPKT=modal stiffness of tires/isolators in pitch
$K_4$=scaling constant for best use of processor capacity
Roll:

$Rxdyn=K_4*IRKt*RFdyn+Rreq$ where
Rreq=required roll attitude of vehicle
IRKt=modal stiffness of tires/isolators in roll
$K_4$=scaling constant (described above)
Warp:

$Wxdyn=K_4*IWKt*WFdyn+Wreq$ where

Wreq=required warp of vehicle

IWKt=modal stiffness of tires/isolators to warp $K_4$=scaling constant (described above)

The Wreq is an optional term that can be used as a bias term proportional to the modal warp calculated from the force measurements at the actuators, since it is preferable to have a warp force on the vehicle body during cornering to assist steering.

From Hxdyn, Pxdyn, Rxdyn and Wxdyn are calculated dynamic displacements required of each actuator, the X1req, X2req, X3req signals. The calculation for X1req is as follows (the calculation for X2req, etc, being similar):

$$X1req=[IVrfHO*HXdyn+IVrfPO*PXdyn+IVrfRO*Rxdyn+IVrfWO*WXdyn]$$

where

X1req=required displacement of actuator controlled by control device 100

IVrfHO, IvrfPO, IVrfRo, IVrfWO=scaling factors to convert modal displacements demands to the co-ordinates of the actuator controlled by control device 100

It can therefore be seen that the actuators are controlled to extend to compensate for flexing of the isolators and tires under dynamic loading.

The Xreq signals are digitally filtered by the central control processor to smooth changes in value and then are converted back into modal co-ordinates and combined with modal displacements calculated from the measured displacements of the actuators, to arrive at values of Hxs, Pxs, Rxs, Wxs, the displacement of the modal springs and dampers in the force modes of Heave, Pitch, Roll and Warp. The Hxs, Pxs, Rxs and Wxs terms are then used in the calculations of modal velocity demands from the forces measured by the load cells and the displacements measured by the L.V.I.T.'s.

The central control device also sends load correction terms to each corner control device; F1cor, F2cor, F3cor and F4cor. The load correction terms are calculated to account for forces transmitted to the vehicle body not measured by the load cells, both due to the springs in parallel with the load cell and the imperfections in the physical suspension system, and also to remove from the detected force at the load cells dynamic forces resulting from the inertia of the vehicle (Hfdyn, Pfdyn, Rfdyn and Wfdyn).

The correction terms for unmeasured loads are determined by controlling the actuators to extend whilst the vehicle is stationery and measuring the forces that arise when the vehicle body undergoes heave and roll when the vehicle is stationary.

The Corner Control Devices

Each of the corner control devices controls just one actuator. Each receives analogue signals from the load cell attached to the actuator and from the L.V.I.T. arranged to measure the expansion of the actuator and from the hub accelerometer attached to the relevant wheel and hub assembly. Each corner control device also receives from the central control device in digital signals the Fcor, Xreq and DXcen signals already described.

Figure 6:
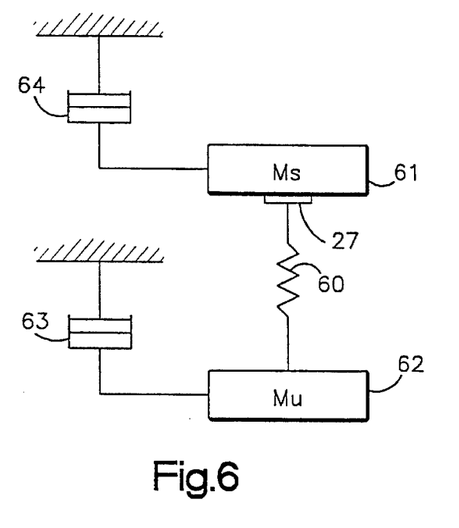
FIG. 6 shows schematically a model of a suspension system used by a corner processor.

Each corner control device calculates a velocity demand signal based on chosen actuator stiffness and damping. DXcor is the corner velocity requirement generated by one of the corner devices. Each corner control device models a mass/spring/damper system as seen in FIG. 6. The model has a sprung mass 61 of mass Ms, representative of the vehicle body and unsprung mass 62, representative of a wheel and hub assembly. Both the sprung mass 61 and the unsprung mass 62 are connected to fixed references by dampers 63 and 64. Damper 63 has a chosen damping constant Cu. Damper 64 has a different chosen damping value CC. A spring 60 of sprung rate Kc acts between the sprung mass 61 and the unsprung mass 62.

The model has the following force equilibrium equation:

$$F = \frac{1}{ICC} DXcor - MKs*Xj \qquad (Y)$$

Therefore $$DXcor=ICC*[F+MKs*Xj]$$

where

F=force measured by load cell 27

DXcor=velocity of sprung mass 61

ICC=modelled inverted corner damping

MKs=modelled corner stiffness

Xj=measured displacement (Xs–Xu)

However, the load cell 27 measures forces due to dynamic loads and these must be removed so that the corner control device does not require the actuator to deflect in response to dynamic loading (the response to dynamic loading being based on the modal model of the central control device). Also the corner model should not consider the extension of the actuator to compensate for the deflection of tire and isolator under dynamic loading; the Xreq terms calculated by the central control processor. Furthermore, since the load cell does not measure the force tranmitted to the vehicle body by the road spring which acts in parallel with the actuator, such force must be calculated. Therefore the equation (Y) is altered as follows:

$$DXcor = K_3*Icc*[8*(F + Fcorr + 2*K_2*Kcs*X) + 4*K_2(Mks + (X - Xdym))] \qquad (Z)$$

where $K_3$=a scaling constant to enable best use of the processor.

Fcorr=force correction to remove dynamic loading (from central processor)

Xdym=required dynamic displacement (calculated from the Xreq signal from the central processor—see below)

Kcs=corner parallel spring stiffness

The Xdym term is a filtered dynamic displacement term calculated by the following iteration.

Firstly a velocity demand signal DXreq is calculated:

$$DXreq=K_5*Kdyn*(Xreq-Xdynm \text{ old})$$

when

DXreq=velocity required of actuator to compensate for tire/isolator deflection under dynamic loads Kdyn=filtering constant Xdynm old=old filtered signal of displacement required of actuator to counteract tire and isolator displacement Xreq=Xreq 1 signal received from central control device (see before)

$K_5$=scaling constant to enable best use of processors

Then the new filtered displacement demand Xdym new is calculated:

$$Xdym \text{ new}=Xdym \text{ old}+DXreq*Idyn$$

where

Idyn=integration time constant

The filtering is necessary since in the preferred embodiment the central processor functions at a clock frequency lower than the corner frequencies. The reasons for filtering will be described hereinafter.

The calculated velocity demand DXcor is then combined with the velocity demand DXcen from the central processor to give a velocity error term DXerr:

$$DXerr=DXcen-DXcor$$

The DXerr signal is then filtered as follows:

$$DXeOm:DXeOl=DXeOm\ DXeOl\ old+Kvel*(DXerr-DXeOM:DXOlold)$$

where

DXeOm:DXeOl=filtered velocity error

Kvel=filter constant

DXeOm:DXeOlold=previous velocity error signal

The modelled system must be compared to the physical system to arrive at a suitable velocity demand for the actuator and this is discussed below.

Figure 7:
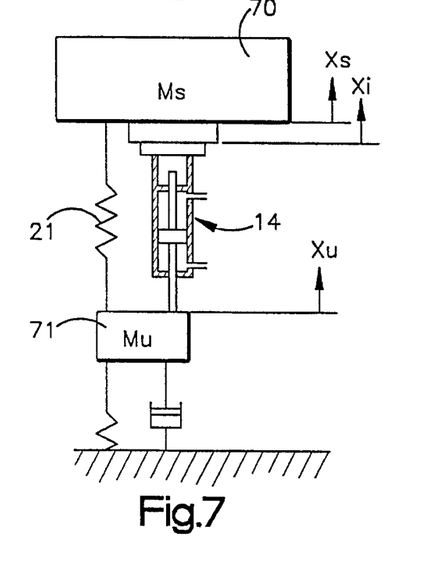
FIG. 7 shows schematically the physical arrangement of an actuator and road spring acting between the vehicle body and to a wheel and hub assembly.

The model of FIG. 6 corresponds to the physical system shown in FIG. 7, where there can be seen a sprung mass 70 representative of the vehicle body of mass Ms, an unsprung mass 71 representative of the wheel and hub assembly of mass Mu, and acting between then an actuator 14 and a road spring 21. The tire stiffness is represented by a spring and damper system.

In the physical system, assuming no isolator damping, the force in the load cell is Fm where:

$$Fm=Ki*(Xi-Xs)$$

also if the actuator displacement=Xj=Xu−Xi then:

$$Fm=Ki*(Xu-Xj-Xs)$$

therefore $Xu-Xs=Xj+Fm/Ki$    (1)

also by differentiating:

$$DXs=DXu-DXj-DFm/Ki \quad (2)$$

The equations of motion for the control system of FIG. 6 are:

$$Ms*DDXs=Kc*(Xu-Xs)-Cc*DXs \quad (3)$$

$$Mu*DDXu=Kc*(Xu-Xs)-Cu*DXu \quad (4)$$

where Ms*DDXs is the measured load cell force Fm. Subtracting (4) from (3) and ignoring factors of 2, gives:

$$Fm=Kc*(Xu-Xs)-Cc*DXs+Cu*DXu+Mu*DDXu \quad (5)$$

Substituting (1) and (2) into (5) gives:

$$Fm=Kc*(Xj+Fm/Ki)-Cc*(DXu-DXj-DFm/Ki)+Cu,DXu+Mu*DDXu$$

The requirement to maintain adequate control over the relative motion of the two masses implies that Kc is much greater than Ki. Assuming this then the above equation can be re-written as:

$$Fm=Xj*Kc+DXj*Cc+DXu*(Cu-Cc)+DDXu*Mu-DFm*Cc/Ki$$

The control processor requires a velocity demand output to the actuator. Therefore, making velocity the subject of the equation:

$$DXj = \frac{1}{Cc} * [Fm - Xj*Kc - DXu*Cu - Mu*DDXu] + DXu - \frac{DFm}{Ki}$$

During development of the system it has been found that the term DFm/Ki is only of minor importance and also relatively difficult to generate and it has therefore been dropped from the equation.

The term DXu*Cu/Cc is combined with DXu generally in the control system with DXu multiplying a hub damping gain KufC. The algorithm is implemented in full in the corner processing leaving the following as the basic velocity drive.

$$DXj = \frac{1}{Cc} * [Fm - Xj*Kc] + KufC*DXu - Mu*DDXu$$

where in the code

1/CC=Inverted damping ICC fm=Load cell force (F in model)

Xm=displacment

Kc=Required corner stiffness (MK in model)

Kufc=Hub velocity gain

DXu=Estimated hub velocity

Mu=Hub acceleration gain (MMc in model)

DDXu=Measured hub acceleration

The hub accelerometer 29 measures the term DDXu and the hub velocity DXum is calculated either by integrating the measured acceleration or by differentiating the position signal X. The Icc [Fm−Xj*Kc] term is equivalent, as previously shown at Y on page 24 to DXcor, which signal is modified as shown at Z on page 25. To the modified signal at Z must be added the filtered modal velocity demand DXeOm.DX01. This leaves the following:

$$DXmod=K_6*[DDXu\ MMc+Kufc*DXum]+K_4*[K_3^{-1}DXcor+DXeOM:Dxeol]$$

where

DXmod=Actuator velocity demand

DDXu=Measured hub acceleration

MMc=Hub acceleration (or mass) gain

Kmfc=Hub velocity (or damping) gain

DXum=Calculated hub velocity $K_3, K_4, K_6$=scaling constants to ensure best use of processor Therefore the velocity demand signal DXmod comprises the sum of the sum of the DXcor signal calculated from the corner model and a low pass filtered DXcen signal. The DXcor signal is not limited to any particular bandwidth and therefore the actuator can react at high frequency in response to loads imposed by the actuator by road inputs (the dynamic inputs having been removed from the detected force F by the Fcor signals). The DXerr signal which derives from the difference between DXcen and DXcor acts to compensate for dynamic loading and it is low pass filtered to restrict the bandwidth typically to frequencies of 1.2 Hz and below (this is done by calculated selection of Kvel). The actuator therefore reacts at high and low frequencies to load inputs whilst reacting only at low frequencies to dynamic inputs.

Before the DXmod signal is sent to the servo-valve it is summed in the preferred embodiment with the DXreq signal, the DXreq signal being the velocity demand signal calculated as shown before from the position demand Xreq signal to cause extension of the actuator to compensate for tire and isolator compliance. Furthermore in the preferred embodiment the sum of DXreq and DXmod signals is modified by a "Bump Stop" algorithm as discussed in International Publication No. WO90/12699.

In the preferred embodiment the central control device is a digital processor with a clock frequency of 100 Hz. The corner control devices are also digital processors which operate at a clock frequency of 1KHZ. Therefore the corner control devices only receive the Fcor, DXcen and Xreq signals in every tenth clock pulse. If the DXcen signal is not filtered before combination with DXcor then sudden impulsive changes could result every tenth clock pulse of the corner processor. The filtering of DXcen enables a distributor system to operate with a central processor operating at a lower frequency than the corner processors.

The method of the invention also enables the cut-off frequency between modal control and corner control to be easily changed, by variation of Kvel. Also since the control velocity demand it filtered into the combined velocity demand, rather than being stepped in the gains used in the control circuits of the central control device can be increased to and/or a quicker response time and more accurate control.

I claim:

1. A vehicle suspension system for use in a vehicle having vehicle wheel and hub assemblies and a vehicle body, the vehicle suspension system comprising:

a plurality of actuators connected between the vehicle wheel and hub assemblies and the vehicle body, each of the plurality of actuators being contractible and extendable to control the vehicle attitude;

first control means associated with at least one of the plurality of actuators and for generating a respective first control signal which is indicative of a load applied to the vehicle in response to a road input to the vehicle;

second control means associated with the plurality of actuators and for generating a second control signal which is indicative of a load applied to the vehicle in response to a driver input to the vehicle;

filtering means associated with the second control means and for filtering the second control signal from the second control means to remove signals which are above a predetermined bandwidth of frequencies; and means for combining the first control signal with the filtered second control signal to provide an actuator control signal which is applied directly to the at least one actuator, the actuator control signal varying as a function of (i) the first control signal having signals within the predetermined bandwidth of frequencies and signals above the predetermined bandwidth of frequencies and (ii) the filtered second control signal having signals only within the predetermined bandwidth of frequencies to control contraction and extension of the at least one actuator and thereby to provide control of the vehicle attitude.

2. A vehicle suspension system according to claim 1 wherein the filtering means is adjustable to set the bandwidth of frequencies above which signals from the second control means are removed.

3. A vehicle suspension system according to claim 1 wherein each of the first and second control means includes a digital processor, and the first control means operates at a higher clock frequency than the second control means.

4. A vehicle suspension system according to claim 1 further comprising force sensor means for measuring the force transmitted by each actuator to the vehicle body and resolving the forces into the modal forces of heave, pitch, roll, and warp.

5. A vehicle suspension system according to claim 1 further comprising sensor means for measuring displacement of and forces on the vehicle body and for generating signals indicative thereof, the first control means generating the first control signal using the signals generated by the sensor means in a first model of a spring and damper system, the second control means generating the successive second control signals using the signals generated by the sensor means in a second model of a spring and damper system.

6. A vehicle suspension system according to claim 1 wherein the second control means uses a model of a spring and damper system acting in the modal coordinates of heave, pitch, warp, and roll.

7. A vehicle suspension system according to claim 1 wherein the second control means controls an actuator to extend to compensate for deflection of the tires under loading.

8. A vehicle suspension system according to claim 1 wherein the second control means controls an actuator to respond to low frequency loading on the vehicle body arising from maneuvering of the vehicle.

9. A vehicle suspension system for use in a vehicle having vehicle wheel and hub assemblies and a vehicle body, the vehicle suspension system comprising:

a plurality of actuators connected between the vehicle wheel and hub assemblies and the vehicle body, each of the plurality of actuators being contractible and extendable to control the vehicle attitude;

first control means associated with at least one of the plurality of actuators and for generating a respective first control signal having a first clock frequency, said first control signal indicative of a load applied to the vehicle in response to a road input to the vehicle;

second control means associated with the plurality of actuators and for generating a second control signal having a second clock frequency, said second control signal indicative of a load applied to the vehicle in response to a driver input to the vehicle, the second clock frequency of the second control signal being lower than the first clock frequency of the first control signal;

filtering means associated with the second control means and for filtering the second control signal from the second control means to remove signals which are above a predetermined bandwidth; and means for combining the first control signal with the filtered second control signal to provide an actuator control signal which is applied directly to the at least one actuator the actuator control signal varying as a function of (i) the first control signal having signals within the predetermined bandwidth of frequencies and signals above the predetermined bandwidth of frequencies and (ii) the filtered second control signal having signals only within the predetermined bandwidth of frequencies to control contraction and extension of the at least one actuator and thereby to provide control of the vehicle attitude.

10. A vehicle suspension system for use in a vehicle having vehicle wheel and hub assemblies and a vehicle body, the vehicle suspension system comprising:

a plurality of actuators connected between the vehicle wheel and hub assemblies and the vehicle body, each of the plurality of actuators being contractible and extendable to control the vehicle attitude;

first control means associated with at least one of the plurality of actuators and for generating a respective first control signal;

second control means associated with the plurality of actuators and for generating successive second control signals having respective first and second amplitude values at respective first and second times, the second time being later than the first time; and amplitude modification means associated with the second control means and for decreasing the difference in amplitude value between the first and second amplitude values of the successive second control signals by modifying the second amplitude value occurring at said second time of the successive second control signals; and means for combining the first control signal with (i) the respective first amplitude value occurring at said first time of the successive second control signals, and (ii) the modified second amplitude value occurring at second time of the successive second control signals to provide an actuator control signal which is applied to the at least one actuator to control contraction and extension of the at least one actuator to control vehicle attitude.

11. A vehicle suspension system according to claim 10 wherein each of the first and second control means includes a digital processor, and the first control means operates at a higher clock frequency than the second control means.

12. A vehicle suspension system according to claim 10 further comprising force sensor means for measuring the force transmitted by each actuator to the vehicle body and resolving the forces into the modal forces of heave, pitch, roll, and warp.

13. A vehicle suspension system according to claim 10 further comprising sensor means for measuring displacement of and forces on the vehicle body and for generating signals indicative thereof, the first control means generating the first control signal using the signals generated by the sensor means in a first model of a spring and damper system, the second control means generating the successive second control signals using the signals generated by the sensor means in a second model of a spring and damper system.

14. A vehicle suspension system according to claim 13 wherein the second control means uses a model of a spring and damper system acting in the modal coordinates of heave, pitch, warp, and roll.

15. A vehicle suspension system according to claim 10 wherein the second control means controls an actuator to extend to compensate for deflection of the tires under loading.

16. A vehicle suspension system according to claim 10 wherein the second control means controls an actuator to respond to low frequency loading on the vehicle body arising from maneuvering of the vehicle.

* * * * *

UNITED STATES PATENT AND TRADEMARK OFFICE
CERTIFICATE OF CORRECTION

PATENT NO. : 5,475,593
DATED : December 12, 1995
INVENTOR(S) : Richard Townsend

It is certified that error appears in the above-indentified patent and that said Letters Patent is hereby corrected as shown below:

Column 16, line 14, change "1" to --5--.

Signed and Sealed this

Twenty-fourth Day of September, 1996

Attest:

BRUCE LEHMAN

*Attesting Officer*  *Commissioner of Patents and Trademarks*